(12) United States Patent
Mannesson et al.

(10) Patent No.: US 12,276,722 B2
(45) Date of Patent: Apr. 15, 2025

(54) MULTIPATH CLASSIFICATION IN RADAR DETECTIONS

(71) Applicant: Axis AB, Lund (SE)

(72) Inventors: Anders Mannesson, Lund (SE); André Nüsslein, Lund (SE); Anton Sedin, Lund (SE); Aras Papadelis, Lund (SE); Daniel Ståhl, Lund (SE); David Wadmark, Lund (SE); Sebastian Heunisch, Lund (SE); Stefan Adalbjörnsson, Lund (SE)

(73) Assignee: AXIS AB, Lund (SE)

( * ) Notice: Subject to any disclaimer, the term of this patent is extended or adjusted under 35 U.S.C. 154(b) by 244 days.

(21) Appl. No.: 17/748,223

(22) Filed: May 19, 2022

(65) Prior Publication Data

US 2022/0373672 A1 Nov. 24, 2022

(30) Foreign Application Priority Data

May 21, 2021 (EP) .................................... 21175394

(51) Int. Cl.
*G01S 13/88* (2006.01)
*G01S 13/72* (2006.01)

(52) U.S. Cl.
CPC ............ *G01S 13/886* (2013.01); *G01S 13/72* (2013.01); *G06F 2218/12* (2023.01)

(58) Field of Classification Search
CPC ..... G01S 13/886; G01S 13/72; G06F 2218/12
See application file for complete search history.

(56) References Cited

U.S. PATENT DOCUMENTS

2009/0309785 A1   12/2009   Nalezinski et al.
2014/0191899 A1   7/2014    Pickle et al.
(Continued)

FOREIGN PATENT DOCUMENTS

CN   107300698 A   10/2017
CN   110412516 B   5/2021
(Continued)

OTHER PUBLICATIONS

Clarke et al., "Towards mapping of dynamic environments with FMCW radar," IEEE Intelligent Vehicles Symposium, Proceedings. 140-145 (2013).
(Continued)

*Primary Examiner* — Peter M Bythrow
*Assistant Examiner* — Nazra Nur Waheed
(74) *Attorney, Agent, or Firm* — Volpe Koenig

(57) ABSTRACT

A method for classifying tracks in radar detections of a scene acquired by a stationary radar unit, comprises: acquiring radar detections of the scene using the static radar unit; feeding at least a portion of the radar detections into a tracker module for producing track-specific feature data indicating a specific track in the scene, feeding at least a portion of the radar detections into a scene model comprising information about scene-specific features aggregated over time, and information indicating areas in the scene with expected ghost target detections and areas with expected real target detections, wherein at least a subset of the scene-specific features is determined from the radar detections; classifying the specific track as belonging to a real target or to a ghost target by relating the specific track to a position in the scene model.

13 Claims, 4 Drawing Sheets

(56) References Cited

U.S. PATENT DOCUMENTS

| | | | |
|---|---|---|---|
| 2016/0349363 A1 | 12/2016 | Millar et al. | |
| 2019/0018133 A1* | 1/2019 | Takada | G01S 13/56 |
| 2019/0061758 A1* | 2/2019 | Ide | B60W 10/20 |
| 2020/0103523 A1 | 4/2020 | Liu et al. | |
| 2020/0278444 A1 | 9/2020 | Va et al. | |
| 2020/0293860 A1* | 9/2020 | Grassmann | G01S 7/417 |
| 2021/0096210 A1 | 4/2021 | Maher et al. | |
| 2021/0104027 A1 | 4/2021 | Longman et al. | |
| 2021/0349181 A1 | 11/2021 | Nishikido et al. | |
| 2023/0080655 A1* | 3/2023 | Yomo | G01S 7/292 |
| | | | 342/450 |

FOREIGN PATENT DOCUMENTS

| | | |
|---|---|---|
| DE | 102019216373 A1 | 4/2021 |
| DE | 102021001452 A1 | 5/2021 |
| WO | 2019/215734 A1 | 11/2019 |

OTHER PUBLICATIONS

Ryu et al., "Detecting Ghost Targets Using Multilayer Perceptron in Multiple-Target Tracking," Symmetry 2018, 10, 16 (2018).

Prophet et al., "Instantaneous Ghost Detection Identification in Automotive Scenarios," 2019 IEEE Radar Conference (RadarConf), pp. 1-6, (2019).

United States Office Action issued Oct. 17, 2024 for U.S. Appl. No. 17/748,222.

United States Office Action issued on Feb. 6, 2025 for U.S. Appl. No. 17/748,222.

* cited by examiner

MULTIPATH CLASSIFICATION IN RADAR DETECTIONS

FIELD OF INVENTION

The present disclosure generally relates to the field of close-range radar surveillance, and in particular to a method and controller for classifying tracks in radar detections of a scene.

TECHNICAL BACKGROUND

The basis of radar detection is that a transmitted radar signal is reflected off an object and detected by antennas of the radar. By suitable signal processing, properties such as object velocity and position relative the radar can be estimated. However, estimating the location of the object is subject to challenges related to detecting so-called ghost targets, i.e., multiple reflections in the environment mistaken as a real target.

Ghost targets arise due to the difficulty in determining the origin of the detected signal. There is no straight forward way to determine with high accuracy if a detected signal is a direct reflection from the real target, or if the detected signal is a secondary reflection off a nearby surface.

In urban environments where many reflective surfaces are present, such as building walls, containers, parked cars, and traffic signs, ghost targets are a major problem.

One way to handle ghost targets in urban environments is by asking the user to draw exclusion areas in a map of the zone covered by the radar, thereby explicitly instructing the radar where signals should be ignored. However, this degrades the ease-of-use of the radar significantly. Additionally, ghost targets originating from multiple reflections may appear in the detection area, and such reflections are not excluded by adding exclusion areas. Further, new reflective surfaces may be introduced in the scene, for example caused by a truck parking in the scene, and such changes to the scene are not handled by predefined exclusion areas.

SUMMARY

In view of above-mentioned and other drawbacks of prior systems, providing an improved method for classifying tracks in radar detections of a scene as belonging to a ghost target or a real target that alleviates at least some of the drawbacks of prior art would be beneficial.

According to a first aspect of the present disclosure, it is therefore provided a method for classifying tracks in radar detections of a scene acquired by a stationary radar unit. The method comprises the following steps: Acquiring radar detections of the scene using the static radar unit. Feeding at least a portion of the radar detections into a tracker module for producing track-specific feature data indicating a specific track in the scene. Feeding at least a portion of the radar detections into a scene model comprising information about scene-specific features aggregated over time and information about areas in the scene with expected ghost target detections and areas with expected real target detections. At least a subset of the scene-specific features of the model is determined from the radar detections. The method further comprises classifying the specific track as belonging to a real target or to a ghost target by relating the specific track to a position in the scene model.

The present disclosure is based upon the realization to separate tracks from real targets from those of ghost-targets, also called multipath targets, by utilizing detections from the radar to both produce a scene model of scene specific feature and to produce track-specific features. More specifically, the scene model is a time-wise aggregate of information about the scene over time, which may include information about detected objects and prior detected tracks. Thus, the scene specific features may comprise information about both static objects and surfaces in the scene and information about tracks both from ghost targets and from real targets. Stated in other words, the scene model comprises information about scene-specific features descriptive of the scene as determined from the radar detections, and spatial information of historical tracks.

Such a scene model provides information about where in the scene a ghost-target is most likely to occur, and where a real target is most likely to occur, based on the aggregated information from prior detected tracks and scene-specific features in the scene.

The track specific feature data provides information about a specific track. By relating, e.g., correlating, the track specific feature information to information stored in the scene model about prior tracks and the general layout of the scene, it is possible to predict whether the specific track belongs to a ghost target or to a real target. In other words, the track-specific feature data may provide snap-shot information about the specific track, and this information is compared to historical data in the scene model to classify the specific track.

By means of embodiments of the present disclosure, the herein described classification of the targets provides for reduced number of false positives that may cause false alarms in for example surveillance applications. Further, installation is made less complicated since e.g., no exclusions zones are needed. Still further, the classification method may enable for use also indoor, in more dense environments where the amount of ghost tracks is larger compared to outdoor environments.

The scene model may be a map of scene specific features as detected over time, and may thus include information about e.g., reflective surfaces, and areas of strong targets e.g., with high signal to noise ratio, closest targets, weak targets, e.g., with low signal to noise ratio, and most distant targets, as well as track-specific features. Closest and most distant targets are of interest because ghost targets generally appear at larger distances than the real target.

The scene specific features may be considered track specific, spatial features aggregated over time, that is, the spatial temporal evolution of track specific features in the scene. Further, due to the aggregation, the timescale of the scene-specific features is longer than the lifetime of a track-specific feature which may indicate a snapshot of the state of the specific track. In other words, track specific data may be considered related to the present state of a specific track, e.g., information that describes the specific track as detected in a current frame. A frame is herein related to the discretized/digitized operation of the radar.

A stationary radar should be interpreted as a radar that is statically mounted and does not move around. Further, a stationary radar does not have moving parts that sweep the scene. Instead, the radar is adapted to detected signals from all directions without using beamforming or sweeping.

The stationary radar unit may be a close-range radar configured for surveillance of the scene.

In some embodiments, the track-specific feature data and the scene-specific features from the scene model related to the specific track is passed to a classifier module adapted for classifying the specific track. Thus, the classifier module is adapted to classify the specific track from the information in the track-specific feature data and scene-specific feature data from the scene model that is related to the specific track. In one possible implementation, the classifier module includes a neural network for classifying the specific track.

A neural network provides for an efficient tool for classification. The neural network is preferably adapted to capture the temporal evolution of the specific track. Various types of neural networks adapted to perform classification is conceivable and known per se. Example suitable neural networks are a recurrent neural network and a convolutional neural network. A recurrent neural network is especially efficient for capturing temporal evolutions.

Further, other suitable classifiers may be decision tree classifiers such as random forest classifiers that are efficient for classification. In addition, classifiers such as support vector machine classifiers and logistic regression classifiers are also conceivable.

In addition, the classifier may be a statistical classifier, a heuristic classifier, a fuzzy logic classifier. Further, it is also feasible to use a table, i.e., a look-up table with combinations of data such as scene specific features and a track specific features and the corresponding classifications, ghost target or real target.

In some embodiments, the specific track may be assigned with scene-specific features based on a determined position of the specific track in the scene. These scene-specific features are for example, the probability that the specific track is occluded by a reflective surface, and how strong the signals have been from prior tracks in the same area. This provides for more accurately classifying the specific track in the classifier. In particular, the assigning step provides for forwarding the most suitable scene specific features to the classifier.

Further, the scene specific features assigned to the specific track may advantageously be added to the scene model. In addition, the specific track may be added to the scene model. Accordingly, more information is added to the scene model which thereby improves the scene model and therefore also the accuracy of the classifying step in separating tracks from real targets from those of ghost-targets in future detection. In other words, the scene model is improved on-line, while using the classification method such that the scene model is more accurate for coming classifications.

In embodiments, producing track-specific feature data may comprise forming a representation of a time evolution of at least one of range measurements, doppler measurements, azimuth angle measurements, and elevation angle measurements, and processing the representation in a neural network.

Track specific features may be determined from various types of measurements performed from radar detections. For example, such as using at least one of range measurements, doppler measurements, azimuth angle measurement, and elevation angle measurement, and whether the specific track is the current strongest specific track or the closest one to the radar unit in a current time frame, or if the specific track is the weakest specific track or is the track furthest away from the radar unit in a current time frame.

Embodiments of the present disclosure are applicable to various types of stationary radars. In one preferred embodiment is the stationary radar is a frequency-modulated continuous wave radar.

In some embodiments, all the scene-specific features may be determined from the radar detections. Accordingly, the radar may be operative as a stand-alone unit.

However, in other possible embodiments, at least a portion the scene-specific features are determined from optical image data captured by an optical sensing device. Thus, the method is applicable to fusion systems comprising e.g., a camera and a radar, where the detail of scene specific features is improved by also including scene-specific features detected by the camera.

The feeding of radar detection into the scene model and into the tracker module may be split or combined in different ways. For example, the same radar detections may be fed into the tracker module and into the scene model. This provides for simple and straight forward feeding without the need for separating different types of detections.

Nevertheless, it may be advantageous to feed all radar detections to the scene model and only radar detections indicating moving targets to the tracker module. In this way, the tracker module only has to process data related to targets that are most relevant for determining a specific track, thereby relieving the required processing power for the tracking module, and potentially improving accuracy of the subsequent classifying step.

In some embodiments, a specific track may be compared to a representation of the scene acquired by an optical sensing device, whereby, if no corresponding track is present in the representation of the scene acquired by the optical sensing device, classifying the specific track as a ghost-track. Thus, a fusion system comprising a radar unit and e.g., a camera may provide for a spatial correspondences and non-correspondences testing to provide indications of whether a track is a ghost track or a real track. This type of fusion system use may improve the classification further since it provides additional information about the scene and tracks therein. One embodiment of an optical sensing device is an image sensor as used in cameras. Other examples for such sensing devices are LIDAR and optical time-of-flight sensors. Even acoustic sensors, in particular microphone arrays, that obtain similar spatial data about the scene specific features as the radar can be used.

According to a second aspect of the present disclosure, there is provided computer program comprising instructions which, when the program is executed by a computer, cause the computer to carry out the method of any of the herein discussed embodiments.

Further embodiments of, and effects obtained through this second aspect of the present disclosure are largely analogous to those described above for the first aspect of the disclosure.

According to a third aspect of the present disclosure, there is provided a control unit for classifying tracks in radar detections of a scene acquired by a stationary radar unit, the control unit being configured to: acquire data indicative of radar detections of the scene captured by the static radar unit; processing at least a portion of the radar detections in a tracker module for producing track-specific feature data indicating a specific track in the scene, feed at least a portion of the radar detections into a scene model comprising information about scene-specific features aggregated over time and information about areas in the scene with expected ghost target detections and areas with expected real target detections, wherein at least a subset of the scene-specific features are determined from the radar detections; and classify the specific track as belonging to a real target or to a ghost target by relating the specific track to a position in the scene model.

Further embodiments of, and effects obtained through this third aspect of the present disclosure are largely analogous to those described above for the first aspect and the second aspect of the disclosure.

There is further provided a system comprising a stationary radar unit and a control unit according to the third aspect.

The system provides similar advantages and features as any one of the herein described embodiments.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

Figure 1:
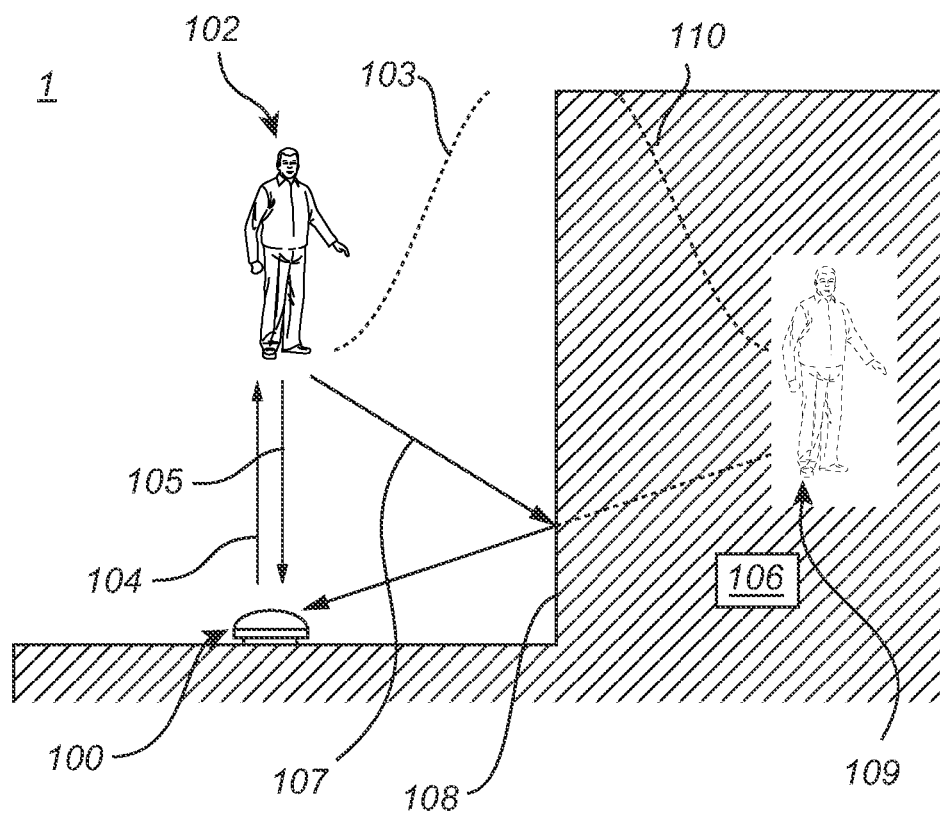
FIG. 1 conceptually illustrates a stationary radar unit arranged to acquire radar detections from a scene.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Turning now to the drawings and to FIG. 1 in particular, there is shown a scene 1 and a stationary radar unit 100 arranged to acquire radar detections from the scene 1. In the scene 1, also considered the detection area of the radar unit 100, a target 102 is moving along a path 103. The stationary radar unit 100 emits radar signals 104 towards the scene 1. Some of the signals, here indicated as 105 are reflected off target 102 and is directly returned to the stationary radar unit 100. The radar signals 105 are detected by antennas of the stationary radar unit 100. The detection of radar signals using a radar and the operation of a radar is considered per se known in the art and will not be described in detail herein.

The scene 1 further comprises a reflective object 106, such as a wall of a building. The signal 105 returned directly from the target 102 to the radar unit 100 represents the detection of a real target 102. Consequently, a specific track of the real target 102 belongs to the real target 102.

The real target 102 further reflects radar signals 107 towards the surface 108 of the object 106 where it is reflected towards the radar unit 100. Detection of this reflected signal 107, which is transmitted from the surface 108, is interpreted as belonging to an object 109, "inside", the object 106 having moved along path 110, by standard radar detection techniques. This target 109 thus represents a ghost-target 109 because there cannot exist a real target at that position, inside the object 106.

Based on the above discussion, a detected track may be classified as belonging to a real target 102 or to a ghost target 109 by relating the position of detected tracks to positions in a scene model with information about where to expect real targets 102 and where to expect ghost target 109, using methods that will be described next.

The radar unit 100 may be of various types, but in one possible implementation, the stationary radar unit 100 is a frequency-modulated continuous wave radar. Other suitable implementations are other kinds of frequency modulated radars, phase modulated radars, in particular continuous wave phase modulated radars, radars transmitting coherent pulses or pulse trains, or radars using multiple carriers in particular OFDM radars.

Figure 2:
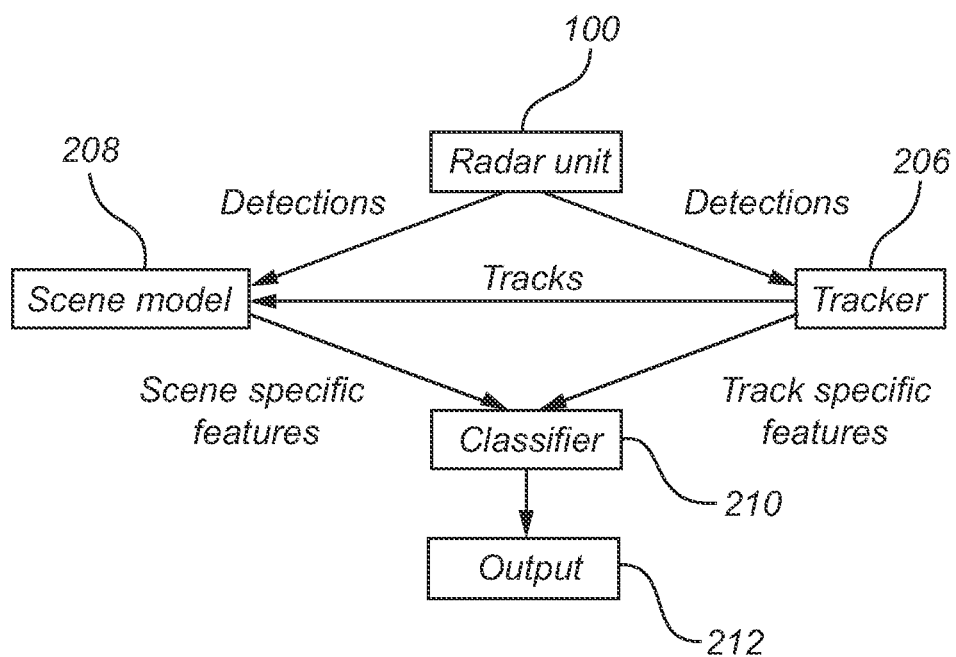
FIG. 2 is a block diagram of a radar unit, and associated functions or modules for classifying a detected track according to embodiments of the disclosure.

FIG. 2 is a block diagram of a radar unit 100, and associated functions or modules for classifying a detected track.

Radar detections from the radar unit 100 are fed into a tracker module 206. The tracker module 206 may be a software module operative on a separate processing circuit or on a common controller for other functions of the classifying method. The tracker module 206 is processes the radar detections received from the radar unit 100 to determine track specific features.

Track specific features comprise at least one of range measurements, doppler measurements, azimuth angle measurement, and elevation measurement, and whether the specific track is the current strongest specific track or the closest one to the radar unit in a current time frame, or if the specific track is the weakest specific track or is the track furthest away from the radar unit in a current time frame, and a current lifetime of the specific track. The tracker module may output the spatial coordinates and a velocity measurement in cartesian or polar coordinates. The velocity may be determined from doppler measurements or by other methods known in the art.

The tracker module 206 preferably only detects targets with non-zero velocity relative the radar unit. This is especially relevant with regards to the closest detection to the radar unit, since there might be static reflections that can be closer to the radar than the closest object. By allowing the radar tracker to only detect non-zero velocity targets alleviate this problem since the tracker module does not detect the static reflections.

Producing the track-specific feature data comprises forming a representation of a time evolution of at least one of range measurements, doppler measurements, azimuth angle measurements, and elevation measurement, and processing the representation in a neural network. Thus, the tracker module 206 may be a neural network used for producing track-specific data using the above-mentioned track specific feature measurements as input to the neural network.

One way of producing track-specific features data is to plot a distribution of measurements like range and doppler measurements for a track for each frame over several frames, forming an image for each track. These images may be considered to show a time evolution of the track-specific features and may be used as input to a convolutional neural network where they are converted into dense features. Other representations of the track specific features are possible such as e.g., so-called point clouds.

Further, radar detections from the radar unit 100 may be fed to a scene model 208. The scene model 208 may be stored in a memory device and comprises scene-specific features aggregated over time. The scene model 208 may be represented by a map of different feature in the scene that have been aggregated over time. Locations of objects and tracks of objects in the scene and spatial information about detected tracks aggregated over time may be included in the scene model 208.

In particular, the scene model 208 comprises information indicating areas in the scene with expected ghost target detections and areas with expected real target detections.

The track-specific features and the scene-specific features are concatenated or fused in some way and are then used as input to a classifier 210. The classifier 210 is specifically configured to utilize the information from the scene model 208 and information of the position of a specific track detected by the tracker 206, to classify the specific track as belonging to a real track or a ghost track.

The classifier module 210 may operate different types of classifiers depending the specific implementation. For example, a classifier neural network may be used that is adapted to perform the classifying step. The neural network is preferably adapted to capture the temporal evolution of the specific track. Various types of neural networks adapted to perform classification is conceivable and known per se. Example suitable neural networks are a recurrent neural network and a convolutional neural network. Other suitable classifiers may be decision tree classifiers such as random forest classifiers. In addition, classifiers such as support vector machine classifiers, logistic regression classifiers, heuristic classifiers, fuzzy logic classifiers, statistical classifiers, or look-up tables are also conceivable to be used in the classifier module 210.

The classifier module provides an output 212 indicating the outcome of the classifying step.

Tracks determined in the tracker module 206 may be assigned with scene-specific features based on the position of the track in the scene. Accordingly, once a specific track is detected, its position may be correlated with positions in the scene model, whereby scene-specific features may be assigned to the specific track. For example, the specific track may be assigned a scene specific feature indicating that the track is occluded by a reflective surface, and how strong the signals have been from prior tracks in the same area. Such assignment provides an indication of whether the specific track originates from a real target or a ghost target. The assigned scene-specific features are fed into the classifier module 210.

In addition, the scene model 208 may be updated by adding the scene specific features assigned to the specific track to the scene model 208. Thereby aggregating further scene-specific features in the model. Further, information about the specific track may be added to the scene model 208. The advantage of adding the features to the scene model 208 is to strengthen the scene model 208 for subsequent classifications. Further, it allows for updating the scene model in case of a change in the scene 1, thus providing for adaptive classification of tracks.

FIG. 2 indicates that radar detections are fed into both the scene model 208 and into the tracker module 206. The radar detections may be split or filtered in different ways, or the same radar detections may be fed to the tracker module 206 and into the scene model 208. In some implementations, all radar detections are fed into the scene model 208 and only radar detections indicating moving targets are fed to the tracker module 206.

All the scene-specific features may be determined from the radar detections. However, in other possible embodiments, the radar is complemented by an optical sensing device such as a camera. In such fusion systems, at least a portion the scene-specific features may be determined from optical image data captured by the optical sensing device thereby enhancing the scene model 208 further by adding additional data from a further source.

Figure 3:
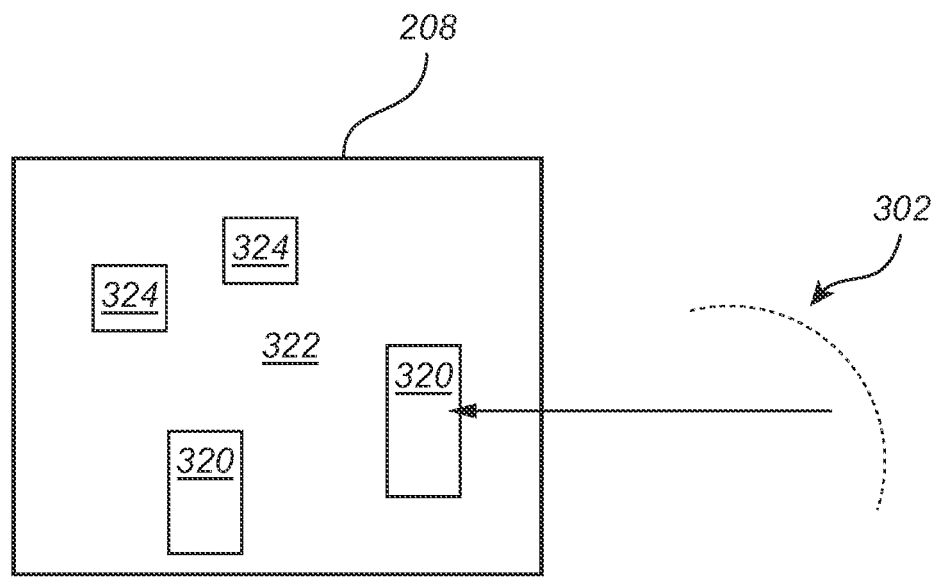
FIG. 3 conceptually illustrates a scene model and a specific track in the process of being related to a position in the scene model according to embodiments of the disclosure.

FIG. 3 conceptually illustrates a scene model 208 and a specific track 302 in the process of being related to a position in the scene model 208.

The scene model 208 comprises information indicating areas 320, 324 in the scene with expected ghost target detections and areas 322 with expected real target detections. The information may include any indication that may relate to or be derivable to that an area is related to real target detections or ghost targets detections. The scene model 208 does not directly indicate areas 320, 322, 324 per se in a map. However, if scene-specific features are extracted from the scene model 208 based on a track falling in a position in e.g., area 320, the extracted scene-specific features together with the track-specific features of the track are likely to result in a ghost target classification. Similarly, if scene-specific features are extracted from the scene model 208 based on a track falling in a position in area 322, the extracted scene-specific features together with the track-specific features of the track are likely to result in a real target classification.

As a further example, it may be known from prior detected tracks that tracks appearing in one position often continue into an area belonging to a position of an object of the scene, such as a building or a container, or a parked truck where a real target cannot be located. Thus, if a track 302 appears in such an area 320 where it is expected to find ghost-tracks, the scene-specific features of the scene model 208 related to such a track may result in that the classifier classifies the track as belonging to a ghost target. Thus, it may be known from the aggregated data in the scene model 208 that tracks appearing in the area 320 are most likely ghost targets.

It should be understood that the area 320 does not necessarily have to be the area occupied by an object in the scene. It should be understood as an area where, if a track is detected in that area, it most likely belongs to a ghost target.

Each time a specific target is detected it may be assigned a scene-specific feature. For example, the specific track 302 may be assigned with scene specific features related to the position where it was detected, e.g., corresponding to the area 320. These scene specific features, and the corresponding track-specific features are fed forward to the classifier for classifying the specific track.

Further, assigning the specific target with scene-specific features may provide for adapting the scene model 208 to a changing scene. For example, assume a new object is introduced in the scene. This new object is detected and mapped using the radar detections fed to the scene model 208 which aggregates the detections over time and therefore maps the new object to the scene model 208. As new tracks are detected, more and more tracks are assigned with scene-specific features related to the new object. Consequently, scene-specific features related to a further area 324 is formed where it is expected that a detected track belongs to a ghost-target. Accordingly, the inventive concept allows for adapting the classification to a changing scene.

Figure 4:
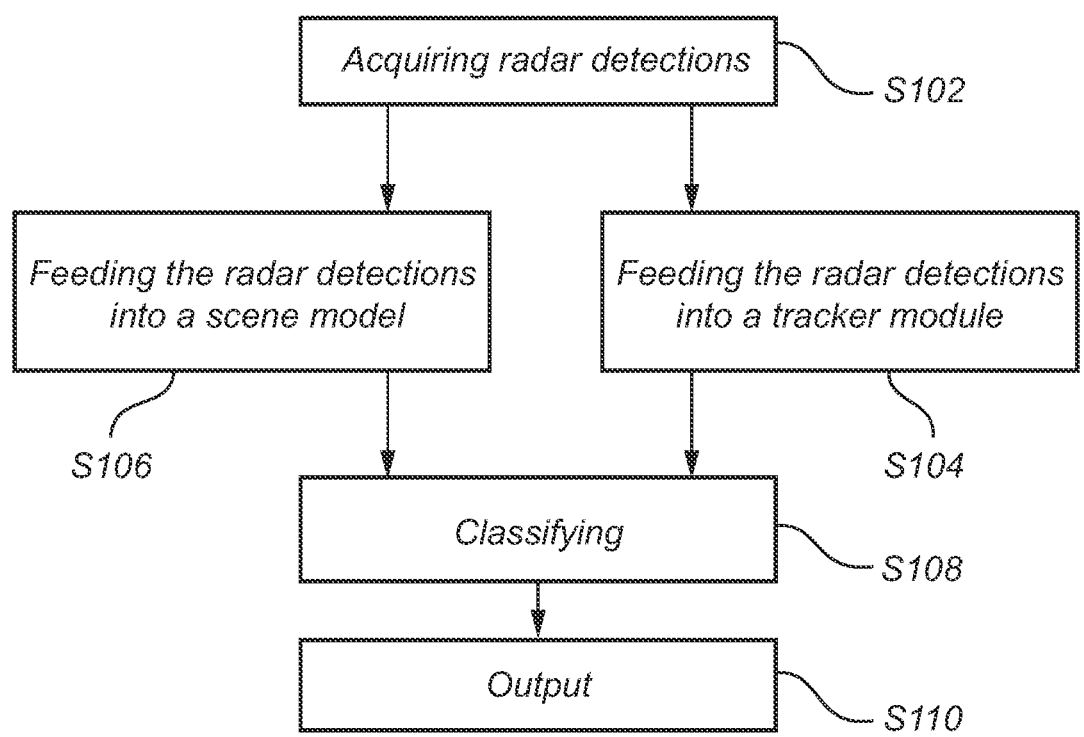
FIG. 4 is a flow-chart of method steps according to embodiments of the disclosure.

FIG. 4 is a flow-chart of method steps according to embodiments of the disclosure.

In step S102, acquiring radar detections of the scene using a static radar unit 100.

In step S104, feeding at least a portion of the radar detections into a tracker module 106 for producing track-specific feature data indicating a specific track 302 in the scene.

In step S106, feeding at least a portion of the radar detections into a scene model 208 comprising information about scene-specific features aggregated over time, and information indicating areas in the scene with expected ghost target detections and areas 322 with expected real target detections. At least a subset of the scene-specific features is determined from the radar detections.

In step S108 classifying the specific track as belonging to a real target 102 or to a ghost target 109 by relating the specific track to a position in the scene model 208.

An output is provided in optional step S110. The output may be used in further processing steps and/or as an indication or signal to a user interface.

Figure 5:
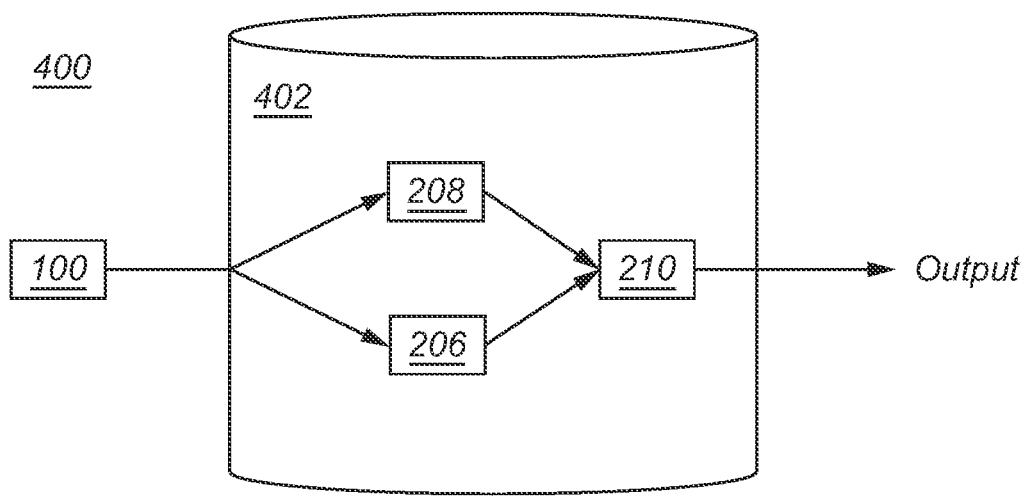
FIG. 5 is a block diagram of system according to embodiments of the disclosure.

FIG. 5 conceptually illustrates a system 400 according to embodiments of the disclosure. The system 400 comprises a stationary radar unit 100 and a control unit 402.

The control unit 402 is configured to classify tracks in radar detections of a scene 1 acquired by a stationary radar unit 100.

The control unit 402 is communicatively connected to the radar unit 100 such that it can acquire data indicative of radar detections of the scene captured by the static radar unit 100. The control unit 402 may be wirelessly connected to the radar unit 100 or it may be hardwired to the radar unit 100 such that data may be transferred from the radar unit 100 to the control unit 402. In some possible implementations, the control unit may be located on a remote server or the like, e.g., implementing the classification method in the "cloud". In other possible implementations, the control unit 402 is comprised in the radar unit 100.

Further, the control unit 402 is configured to process at least a portion of the radar detection data in a tracker module 206 for producing track-specific feature data indicating a specific track 302 in the scene. The tracker module 206 is here conceptually illustrated as part of, or operative on, the control unit 402, e.g., as a software module. However, the tracker module may equally well be operative on a separate control unit in communication with the main control unit 402.

The control unit 402 is further configured to feed at least a portion of the radar detection data into a scene model 208 comprising information about scene-specific features aggregated over time and information about areas 320 in the scene with expected ghost target detections and areas 322 with expected real target detections. At least a subset of the scene-specific features is determined from the radar detections. The control unit 402 may thus be configured to produce scene specific features from the radar detections and add them to the scene model 208. The scene model 208 is stored in a memory device accessible to the control unit 402 or being part of the control unit 402.

The control unit 402 is configured to classify the specific track as belonging to a real target 102 or to a ghost target 109 by relating the specific track to a position in the scene model 208. The control unit 402 feeds the track-specific feature data and the scene model 208 to a classifier module 210 including a classifier adapted for classifying the specific track.

The scene model 208 may be represented as e.g., a look-up table or as map data stored on a memory device, or be stored as discrete grid points.

Figure 6:
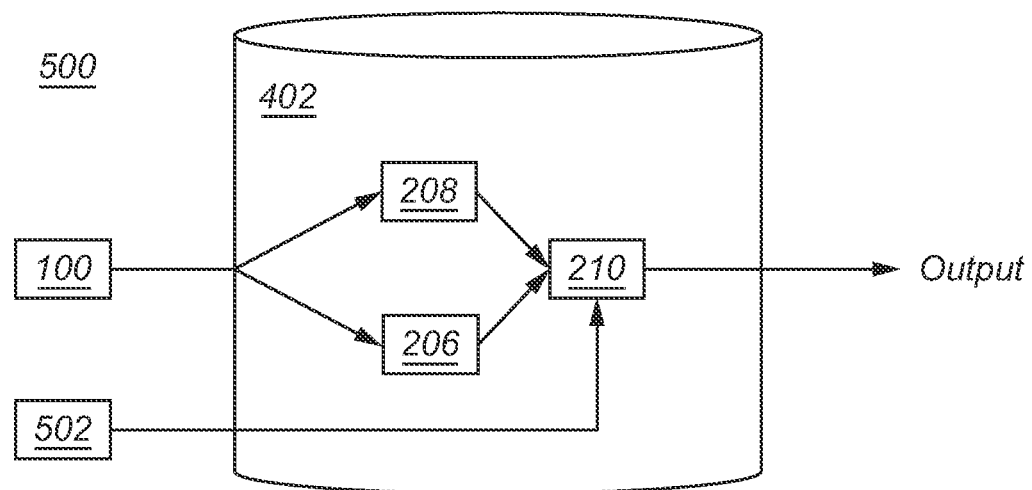
FIG. 6 is a block diagram of system according to embodiments of the disclosure.

FIG. 6 is a block-diagram of a further possible embodiment of the present disclosure. In addition to the features and elements discussed in relation to FIG. 5, the system 500 further includes an optical sensing device 502 such as a camera or a LIDAR. Further, acoustic sensors, in particular microphone arrays are also conceivable.

A specific track determined by the tracker module 206 may be compared, in the classifier module 210 as part of the classification to a representation of the scene 208, or features extracted from the scene, acquired by the optical sensing device 502. For example, if no corresponding track is present in the representation of the scene acquired by the optical sensing device 502, the classifier module 210 may classify the specific track as a ghost-track. In other words, if the classifier module 210 finds no correspondence between a track detected by the camera 502 and the track detected by the radar 100, the output from classifier module 210 is more likely to be that the specific track belongs to a ghost target.

Similarly, if the classifier module 210 indicates a correspondence between a track detected by the camera 502 and the track detected by the radar 100, the output from classifier module 210 is more likely to be that the specific track belongs to a real target. also depending on the output of the classifying module 210.

The control unit includes a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for classifying tracks in radar detections of a scene acquired by a stationary radar unit statically mounted for surveillance of the scene, the method comprising:
    acquiring radar detections of the scene using the stationary radar unit;
    processing at least a portion of the radar detections to produce track-specific feature data indicating a specific track in the scene;
    feeding at least a portion of the radar detections into a scene model comprising information about scene-specific features of the scene aggregated over time including information about detected objects and prior detected tracks from both ghost targets and from real targets of the scene detected by the statically mounted stationary radar, and information indicative of areas in the scene with expected ghost target detections and areas with expected real target detections detected by the statically mounted stationary radar, wherein at least a subset of the scene-specific features is determined from the radar detections from the statically mounted stationary radar; and
    classifying the specific track as belonging to a real target or to a ghost target by relating the specific track to a position in the scene model;
    assigning the specific track with scene-specific features based on a determined position of the specific track in the scene; and
    adding at least one of the specific track and the scene-specific features assigned to the specific track to the scene model to adapt the scene model to a changing scene.

2. The method according to claim 1, further comprising classifying the specific track based on the track-specific feature data and the scene-specific features from the scene model related to the specific track.

3. The method according to claim 1, wherein producing track-specific feature data comprises forming a representation of a time evolution of at least one of range measurements, doppler measurements, azimuth angle measurements, and elevation measurement, and processing the representation in a neural network.

4. The method according to claim 1, wherein track specific features comprises at least one of range measurements, doppler measurements, azimuth angle measurement, and elevation measurement, and whether the specific track is a current strongest specific track or a closest one to the radar unit in a current time frame, or if the specific track is a weakest specific track or is a track furthest away from the stationary radar unit in the current time frame.

5. The method according to claim 1, wherein the stationary radar unit is a frequency-modulated continuous wave radar.

6. The method according to claim 1, wherein all the scene-specific features are determined from the radar detections.

7. The method according to claim 1, wherein at least a portion the scene-specific features are determined from optical image data captured by an optical sensing device.

8. The method according to claim 1, wherein the radar detections that are fed into the tracker module are also fed to the scene model.

9. The method according to claim 1, further comprising feeding all radar detections to the scene model and only processing radar detections indicating moving targets.

10. The method according to claim 1, further comprising comparing a specific track to a representation of the scene acquired by an optical sensing device, whereby, if no corresponding track is present in the representation of the scene acquired by the optical sensing device, classifying the specific track as a ghost-track.

11. A non-transitory computer readable recording medium comprising a computer program comprising instructions which, when the program is executed by a computer, cause the computer to carry a method for classifying tracks in radar detections of a scene acquired by a stationary radar unit statically mounted for surveillance of the scene, the method comprising:
    acquiring radar detections of the scene using the stationary radar unit;
    processing at least a portion of the radar detections to produce track-specific feature data indicating a specific track in the scene;
    feeding at least a portion of the radar detections into a scene model comprising information about scene-specific features of the scene aggregated over time including information about detected objects and prior detected tracks from both ghost targets and from real targets of the scene detected by the statically mounted stationary radar, and information indicative of areas in the scene with expected ghost target detections and areas with expected real target detections detected by the statically mounted stationary radar, wherein at least a subset of the scene-specific features is determined from the radar detections from the statically mounted stationary radar;
    classifying the specific track as belonging to a real target or to a ghost target by relating the specific track to a position in the scene model;
    assigning the specific track with scene-specific features based on a determined position of the specific track in the scene; and
    adding at least one of the specific track and the scene-specific features assigned to the specific track to the scene model to adapt the scene model to a changing scene.

12. A control unit for classifying tracks in radar detections of a scene acquired by a stationary radar unit statically mounted for surveillance of the scene, the control unit being configured to:
    acquire data indicative of radar detections of the scene captured by the stationary radar unit,
    process at least a portion of the radar detection data to produce track-specific feature data indicating a specific track in the scene, feed at least a portion of the radar detection data into a scene model comprising information about scene-specific features of the scene aggregated over time including information about detected objects and prior detected tracks from both ghost targets and from real targets of the scene detected by the statically mounted stationary radar, and information about areas in the scene with expected ghost target detections and areas with expected real target detections detected by the statically mounted stationary radar, wherein at least a subset of the scene-specific features are determined from the radar detections from the statically mounted stationary radar classify the specific track as belonging to a real target or to a ghost target by relating the specific track to a position in the scene model, assign the specific track with scene-specific features based on a determined position of the specific track in the scene, and add at least one of the specific track and the scene-specific features assigned to the specific track to the scene model to adapt the scene model to a changing scene.

13. A system comprising a stationary radar unit and a control unit for classifying tracks in radar detections of a scene acquired by a stationary radar unit statically mounted for surveillance of the scene, the control unit being configured to:

acquire data indicative of radar detections of the scene captured by the stationary radar unit, process at least a portion of the radar detection data to produce track-specific feature data indicating a specific track in the scene, feed at least a portion of the radar detection data into a scene model comprising information about scene-specific features of the scene aggregated over time including information about detected objects and prior detected tracks from both ghost targets and from real targets of the scene detected by the statically mounted stationary radar, and information about areas in the scene with expected ghost target detections and areas with expected real target detections detected by the statically mounted stationary radar, wherein at least a subset of the scene-specific features are determined from the radar detections from the statically mounted stationary radar, classify the specific track as belonging to a real target or to a ghost target by relating the specific track to a position in the scene model assign the specific track with scene-specific features based on a determined position of the specific track in the scene, and add at least one of the specific track and the scene-specific features assigned to the specific track to the scene model to adapt the scene model to a changing scene.

* * * * *